(12) United States Patent
Marchon et al.

(10) Patent No.: US 9,460,739 B1
(45) Date of Patent: Oct. 4, 2016

(54) MONITORING AND CONTROLLING THE ELECTROCHEMICAL WEAR AT THE HEAD-DISK INTERFACE

(71) Applicant: HGST Netherlands B.V., Amsterdam (NL)

(72) Inventors: Bruno Marchon, Palo Alto, CA (US); Sukumar Rajauria, San Jose, CA (US); Erhard Schreck, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/954,514

(22) Filed: Nov. 30, 2015

(51) Int. Cl.
    *G11B 5/455*     (2006.01)
    *G11B 5/40*     (2006.01)

(52) U.S. Cl.
    CPC ........ *G11B 5/455* (2013.01); *G11B 5/40* (2013.01)

(58) Field of Classification Search
None
See application file for complete search history.

(56) References Cited

U.S. PATENT DOCUMENTS

| | | | |
|---|---|---|---|
| 5,388,017 A | 2/1995 | Franco et al. | |
| 5,660,695 A | 8/1997 | Mahvan et al. | |
| 5,729,399 A | 3/1998 | Albrecht et al. | |
| 6,466,408 B2 * | 10/2002 | Baumgart | G11B 5/6005 360/235.7 |
| 7,362,533 B2 * | 4/2008 | Stipe | G11B 5/3133 360/75 |
| 7,489,466 B2 * | 2/2009 | Knigge | G11B 5/3133 360/75 |
| 7,495,856 B2 * | 2/2009 | Payne | G11B 5/3133 360/75 |
| 7,580,759 B2 | 8/2009 | Marchon et al. | |
| 7,957,083 B2 | 6/2011 | Wallash et al. | |
| 7,961,427 B2 | 6/2011 | Dorbeck et al. | |
| 8,139,309 B2 | 3/2012 | Knigge et al. | |
| 8,873,191 B2 * | 10/2014 | Li | G11B 5/607 360/75 |
| 8,947,826 B2 | 2/2015 | Bhatia et al. | |
| 8,995,078 B1 * | 3/2015 | Setuwanto | G11B 5/607 360/75 |
| 9,042,208 B1 * | 5/2015 | Knigge | G11B 21/21 360/75 |
| 9,245,565 B2 * | 1/2016 | Saito | G11B 5/725 |
| 2008/0218895 A1 * | 9/2008 | Scura | G11B 5/6005 360/75 |

* cited by examiner

*Primary Examiner* — Wayne Young
*Assistant Examiner* — James L Habermehl
(74) *Attorney, Agent, or Firm* — Patterson & Sheridan, LLP

(57) ABSTRACT

A method and apparatus for determining the wear on a hard disk drive. Specifically, determining the overcoat wear of a head and/or disk during operation. In one embodiment, the magnetic head is disposed adjacent to the disk. A slider voltage is applied between a disk having a first overcoat and a head having a second overcoat as the disk is spinning By monitoring in real time a change in both touchdown power and a change in an interfacial current at a head disk interface, an electrochemical oxidation of the first overcoat can be determined. Additionally, by changing the polarity of the slider voltage, an electrochemical oxidation of the second overcoat can be determined. Finally, by measuring a passivation current produced between the head and the disk, the precise location of a touchdown event can be determined.

16 Claims, 5 Drawing Sheets

MONITORING AND CONTROLLING THE ELECTROCHEMICAL WEAR AT THE HEAD-DISK INTERFACE

BACKGROUND OF THE DISCLOSURE

1. Field of the Disclosure

Embodiments of the present disclosure generally relate to a magnetic disk device employing a read-write head.

2. Description of the Related Art

To achieve a higher magnetic storage density in a magnetic disk device that employs a read-write head, it is essential to control the physical spacing separating the head from the disk. When the clearance between the read-write head and the disk is too high, the reading/recording performance suffers. As such, the distance between the read-write head of a hard disk drive (HDD) and the disk surface (i.e. the fly height) has been decreasing to the order of nanometers. However, as the spacing between the head and the disk decreases, the potential damage to the HDD increases.

In such a system, every intentional or un-intentional contact between the head and the disk creates wear, especially in the interface materials. Any damage to the interface materials in turn affects the longevity of the HDD. Wear to both the head and disk can occur during a contact situation due to electrochemical processes as the magnetic disk device is reading/writing. Once the drive fails various failure analysis techniques, including atomic force microscope detection (AFM), of the overcoat, can be performed. However, because overcoat wear is critical to the performance of the hard disk drive, there is a need to quantitatively monitor and control the electrochemical wear on the head and disk overcoat before the hard disk drive fails.

Additionally, wear to both the head and disk can occur during a non-contact situation due to electrochemical processes as the magnetic disk device is reading/writing. Thus, real-time monitoring is needed to detect non-contact electrochemical wear during head-disk contact or inadvertent touch downs.

Therefore, an improved method of determining real-time electrochemical head and disk overcoat wear is needed.

SUMMARY OF THE DISCLOSURE

The present disclosure generally relates to the method for determining the wear on a hard disk drive. Specifically, determining the overcoat wear of a read-write head and/or disk during operation. In one embodiment, the magnetic head is disposed adjacent to the disk. A slider voltage is applied between a disk having a first overcoat and a head having a second overcoat as the disk is spinning By monitoring in real time a change in both touchdown power and a change in an interfacial current at a head disk interface, an electrochemical oxidation of the first overcoat can be determined. Additionally, by changing the polarity of the slider voltage, an electrochemical oxidation of the second overcoat can be determined. Further, by measuring a passivation current produced between the head and the disk, the precise location of a touchdown event can be determined.

In one embodiment, a method of determining carbon overcoat wear on a head includes spinning a disk having a first overcoat rotationally as a magnetic disk having a second overcoat is disposed adjacent to and spaced from the disk, applying a slider voltage between the disk and the head, measuring an interfacial current at a head disk interface, measuring a change in touchdown power, and determining an electrochemical loss of the second overcoat.

In another embodiment, a method of determining carbon overcoat wear on a head includes spinning a disk having a first overcoat rotationally as a magnetic disk having a second overcoat is disposed adjacent to and spaced from the disk, applying a slider voltage between the disk and the head, measuring an interfacial current at a head disk interface, measuring a change in touchdown power, and determining an electrochemical loss of the first overcoat.

In another embodiment, a method of determining a touchdown event in a hard drive system includes spinning a disk having a first overcoat rotationally as a magnetic disk having a second overcoat is disposed adjacent to and spaced from the disk, applying a slider voltage between the disk and the head, measuring passivation current produced between the disk and the head, and determining a spatial location of touchdown event using the passivation current.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure.

However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure"

shall not be construed as a generalization of any inventive subject matter disclosed herein and shall not be considered to be an element or limitation of the appended claims except where explicitly recited in a claim(s).

The present disclosure is a method for determining the wear on a hard disk drive. Specifically, determining the overcoat wear of a read-write head and/or disk during operation. In one embodiment, the magnetic head is disposed adjacent to the disk. A slider voltage is applied between a disk having a first overcoat and a head having a second overcoat as the disk is spinning By monitoring in real time a change in both touchdown power and a change in an interfacial current at a head disk interface, an electrochemical oxidation of the first overcoat can be determined. Additionally, by changing the polarity of the slider voltage, an electrochemical oxidation of the second overcoat can be determined. Finally, by measuring a passivation current produced between the head and the disk, the precise location of a touchdown event can be determined.

FIG. 1 shows a disk drive 100 embodying the disclosure. As shown, at least one rotatable magnetic media 102 is supported on a spindle 104 and rotated by a disk drive motor 106. The magnetic recording on each media is in the form of any suitable patterns of data tracks, such as annular patterns of concentric data tracks (not shown) on the magnetic media 102.

Figure 1A:
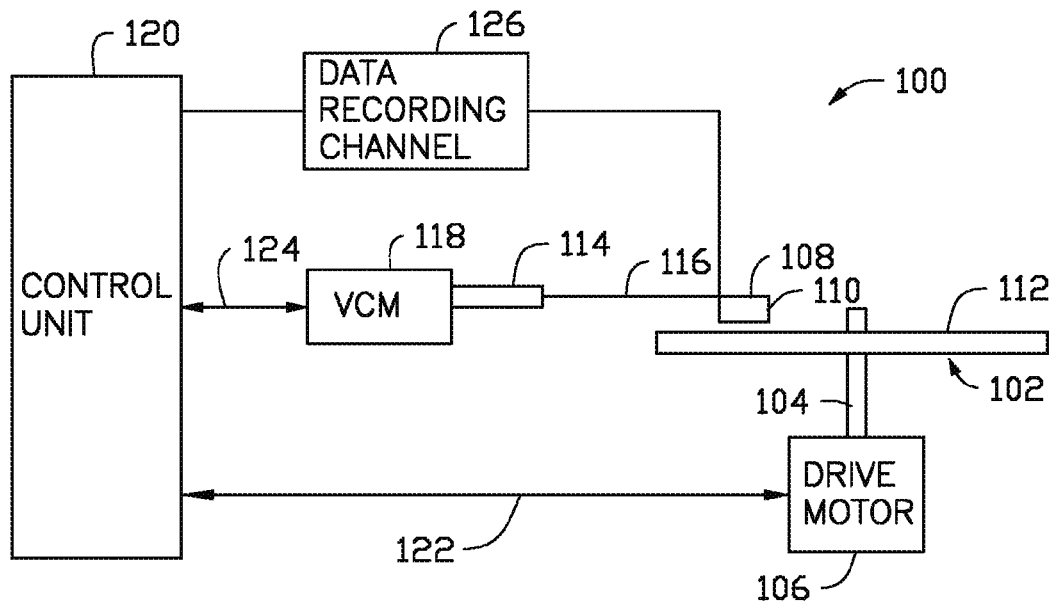
FIG. 1A shows a schematic of a disk drive system according to embodiments described herein.

At least one slider 108 is positioned near the magnetic media 102, each slider 108 supporting one or more magnetic head assemblies 110 on top of the media surface 112. In one embodiment, the read/write head may be a heat-assisted magnetic recording (HAMR) head, a microwave-assisted magnetic recording (MAMR) head, a perpendicular magnetic recording (PMR) head, or bit patterned media recording (BPMR) head. In one embodiment, the magnetic head assembly may include a radiation source (e.g. a laser or LED) for heating the media surface. As the magnetic media 102 rotates, the slider 108 moves radially in and out over the media surface 112 so that the magnetic head assembly 110 may access different tracks of the magnetic media 102 to read or record data. Each slider 108 is attached to an actuator arm 114 by way of a suspension 116. The suspension 116 provides a slight spring force which biases the slider 108 toward the media surface 112. Each actuator arm 114 is attached to an actuator means 118. The actuator means 118 as shown in FIG. 1A may be a voice coil motor (VCM). The VCM includes a coil movable within a fixed magnetic field, the direction and speed of the coil movements being controlled by the motor current signals supplied by control unit 120.

During operation of a disk drive 100, the rotation of the magnetic media 102 generates an air bearing between the slider 108 and the media surface 112 which exerts an upward force or lift on the slider 108. The air bearing thus counterbalances the slight spring force of suspension 115 and supports slider 108 slightly above the media 102 surface by a small, substantially constant spacing during normal operation.

The various components of the disk drive 100 are controlled in operation by control signals generated by control unit 120, such as access control signals and internal clock signals. Typically, the control unit 120 comprises logic control circuits, storage means and a microprocessor. The control unit 120 generates control signals to control various system operations such as drive motor control signals on line 122 and head position and seek control signals on line 124. The control signals on line 124 provide the desired current profiles to optimally move and position slider 108 to the desired data track on magnetic media 102. Write and read signals are communicated to and from write and read heads on the assembly 110 by way of recording channel 126.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
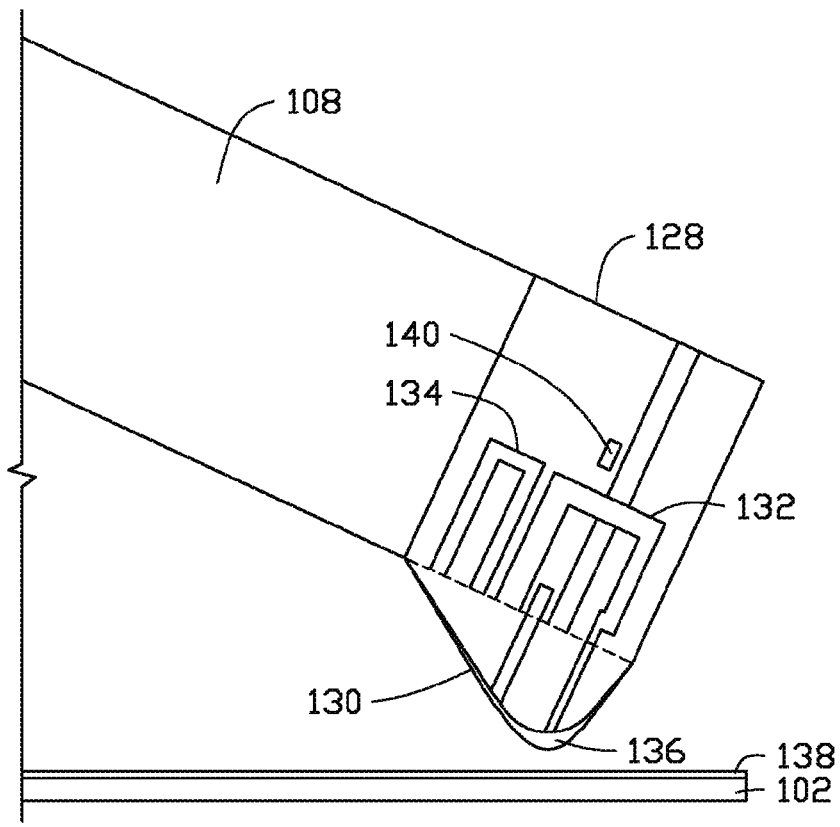
FIG. 1B shows a schematic of a read/write head and a magnetic media of the disk drive described in FIG. 1A.

FIG. 1B is a schematic of a read/write head 128 and magnetic media 102 of the disk drive 100 of FIG. 1A. The read/write head 128 may correspond to the magnetic head assembly 110 described in FIG. 1A. The read/write head 128 includes a media facing surface (MFS) 130, such as an air bearing surface (ABS), a write head 132 and a magnetic read head 134, an overcoat 136, and is mounted on the slider 108 such that the MFS 130 is facing the magnetic media 102 coated in an overcoat 138. In some embodiments, the overcoat (136, 138) is a carbon overcoat. In certain embodiments, the magnetic media 102 may also include a lubricant layer.

In some embodiments, the magnetic read head 134 is a magnetoresistive (MR) read head that includes an MR sensing element located between MR shields. In other embodiments, the magnetic read head 134 is a magnetic tunnel junction (MTJ) read head that includes a MTJ sensing element located between MR shields. The magnetic fields of the adjacent magnetized regions in the magnetic media 102 are detectable by the MR (or MTJ) sensing element as the recorded bits. The write head 132 may be operatively attached to a laser (i.e., a radiation source or a light source). When radiation, such as a laser, is introduced, an evanescent wave is generated. The laser heats up the high-coercivity data bits of the disk 102 so that the write elements of the head 128 may correctly magnetize the data bits.

In certain embodiments, the clearance between the disk 102 and the read/write head 128 is controlled using thermal fly-height control (TFC) technology. The TFC element 140 located in the read/write head 128 locally deforms the region around the read/write head bringing it closer to the disk 102. The distance between the read/write head 128 and the disk 102 can therefore be adjusted by changing the power supplied to the TFC element 140. The power required for the read/write head 128 to contact the disk 102 is the touchdown power (TDP). The smaller the distance between the read/write head 128 and the disk 102, known as the fly height, the lower the signal to noise ratio. However, as the disk 102 spins or rotates during the read/write operation, the slider voltage induces an electrochemical degradation of the overcoat (136, 138) when the read/write head 128 is in too close proximity to the disk 102. Measuring the overcoat (136, 138) degradation and being able to determine the location of the degradation allows for adjustment of the TDP while in operation to the optimal fly height.

Figure 2:
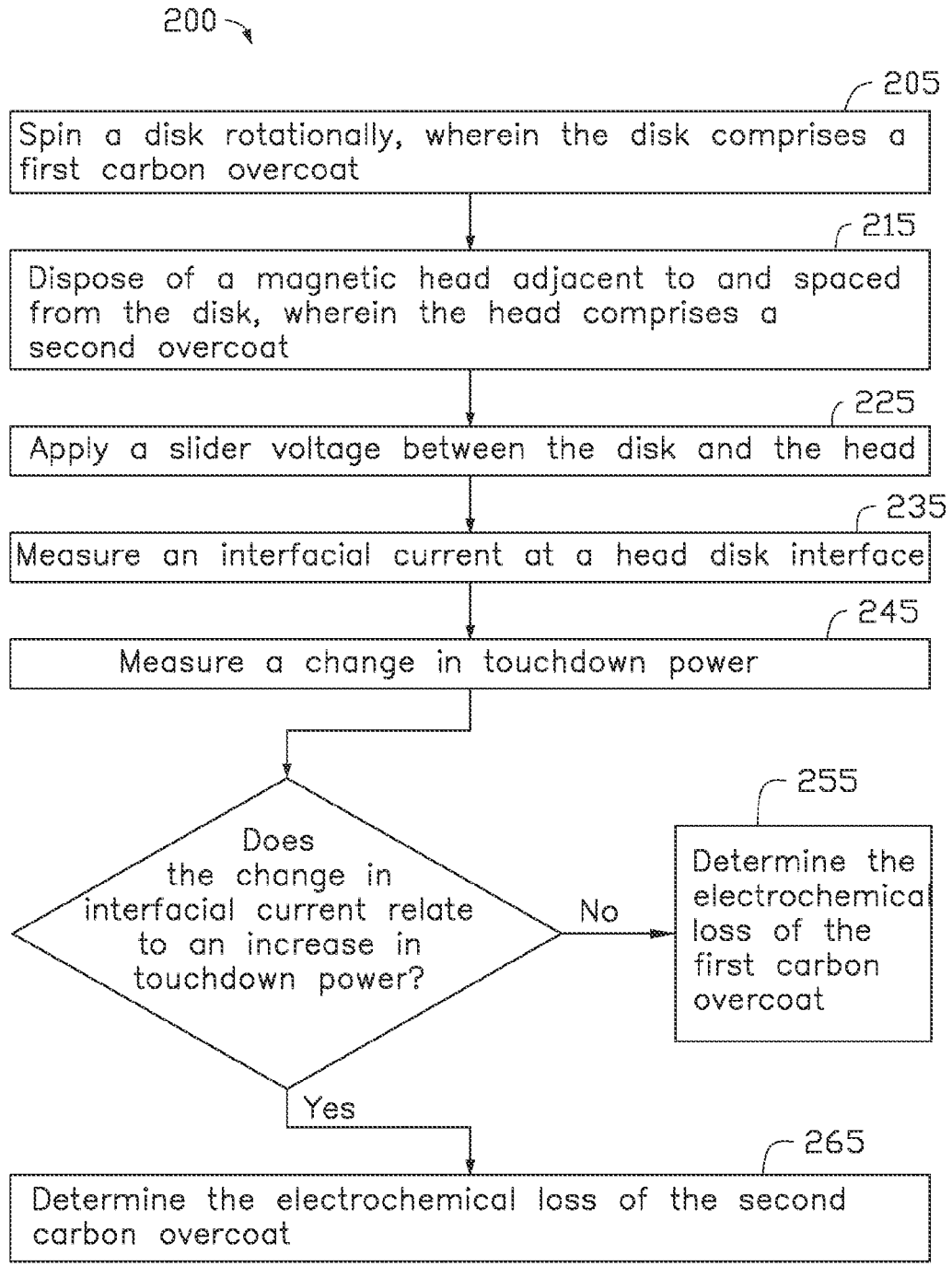
FIG. 2 is a schematic flow chart showing a method of detecting overcoat wear, according to one embodiment.

FIG. 2 shows a method 200 of detecting overcoat wear in a disk drive. The method 200 may be utilized on the HAMR/MAMR/PMR/BPM read/write head 128 and/or disk 102 depicted in FIGS. 1A-1C. At operation 205, disk 102 is spun rotationally. The disk 102 may be spun by applying a direct current to the drive motor 106 actuating the spindle 104 attached to the disk 102. At operation 215, a magnetic head 128 including overcoat 136 is disposed adjacent to and spaced from the disk 102 including overcoat 138. At operation 225, a slider voltage is applied between the disk 102 and the head 128. In one embodiment, the slider voltage is positive and relates to an oxide formation. In another embodiment, the slider voltage is negative. Applying the slider voltage 142 creates an interfacial current between the overcoat 136 of the read/write head 128 and the overcoat 138 of disk 102. In one embodiment the interfacial current is electrochemical. At operation 235, the interfacial current between the overcoat 136 of the head 128 and the disk 102 is measured. In one embodiment the interfacial current can be measured as a function of time using an electrometer. At operation 245, the change in touch down power is measured. The change in the electrochemical current is compared to the change in TDP.

Figure 3A:
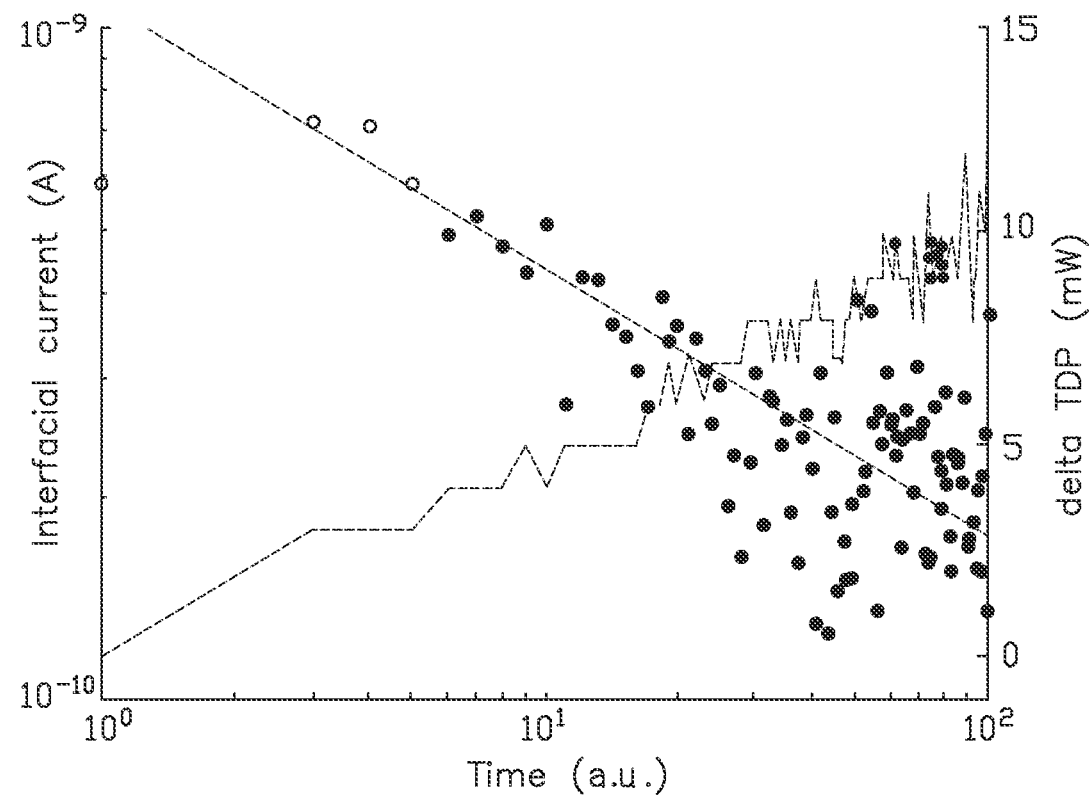
FIGS. 3A and 3C show graphs of the change in interfacial current and touchdown power as a function of time.
Figure 3B:
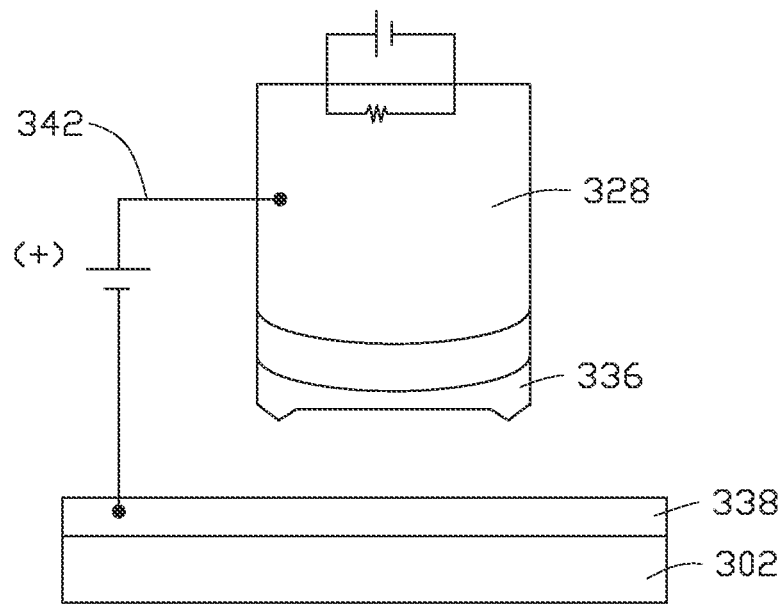
FIGS. 3B and 3D are schematic illustrations of wear occurring on the head and disk respectively.
Figure 3C:
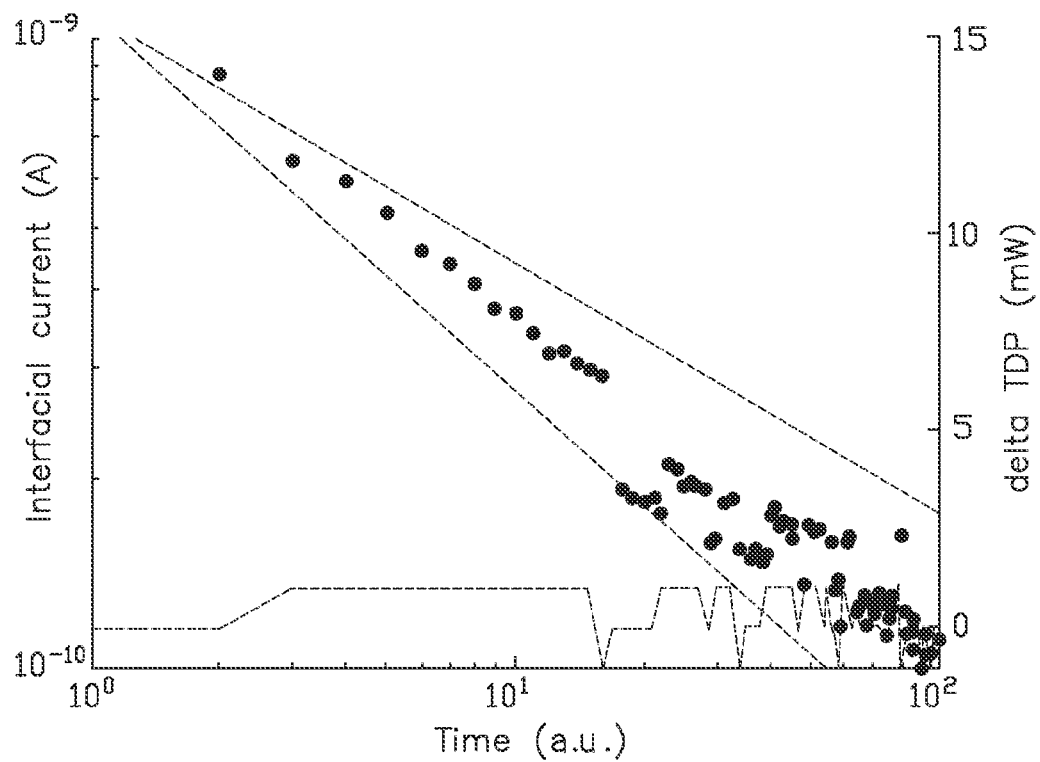

FIGS. 3A and 3C show a graph of the change in interfacial current and TDP as a function of time. The current-time relation is used to estimate the net charge transfer or the overcoat weight loss. If the change in electrochemical current relates to an increase in touchdown power, than the electrochemical loss of the second carbon overcoat is determined at operation 265. If the change in electrochemical current relates to minimal change in TDP than the electrochemical loss of the first carbon overcoat is determined at operation 255.

Figure 3D:
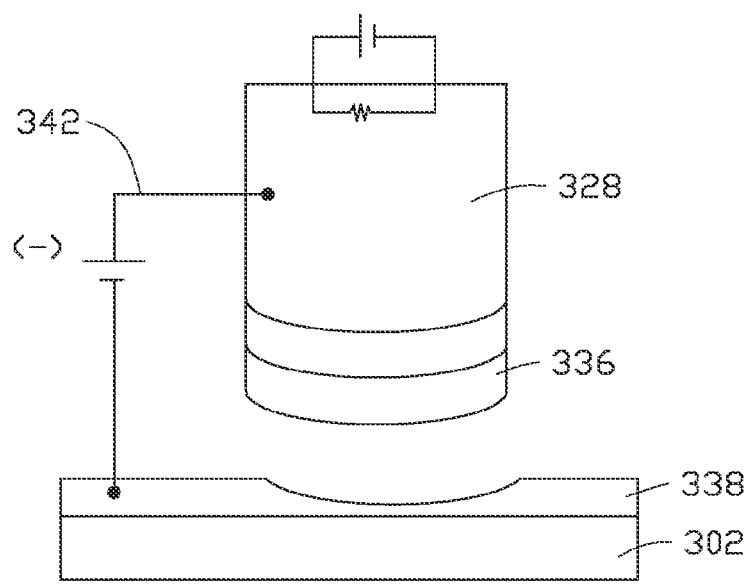

FIGS. 3B and 3D are schematic representations of overcoat wear on the head and disk respectively. It is to be understood that the disk 302, disk overcoat 338, head 336, and head overcoat 336 of FIG. 3B and FIG. 3D may be the same disk 102, disk overcoat 138, head 128, and head overcoat 136 of FIGS. 1A-1B. In one embodiment, shown in FIG. 3B, a positive slider voltage 342 is applied between the head 328 and the disk 302. The head 328 is coupled to the head overcoat 336. It can be imagined that the head overcoat 336 may be made up of one layer or multiple layers. As the interfacial current decreases and the TDP increases, the electrochemical loss of the head overcoat 336 is determined. In another embodiment, shown in FIG. 3D, a negative slider voltage 342 is applied between the head 328 and the disk 302. Here, as the interfacial current decreases the TDP remains minimal and the loss of the disk overcoat 338 can be determined. It should be understood that while FIG. 3B and FIG. 3D show wear on either the head overcoat 336 or disk overcoat 338, wear can occur to both.

The magnitude of the interfacial current is related to the wear in overcoat (136, 138). The volume is used to determine the depth of overcoat (136, 138) wear. Surprisingly, wear on the overcoat 138 of the disk 102 is faster than the overcoat 136 of the head 128.

In one embodiment the real-time monitoring of the wear on the overcoat can be used in a helium drive. In another embodiment the real-time monitoring of the wear on the overcoat can be used to activate a thermally activated desiccator. The thermally activated desiccator changes the environment within the disk drive affecting the wear on the overcoat (136, 138). For example, the desiccator could release or absorb a vapor phase lubricant increasing or decreasing the humidity in the disk drive. In another embodiment, the current could be used in a feedback loop to adjust the TDP thereby increasing or decreasing the fly height.

Figure 4:
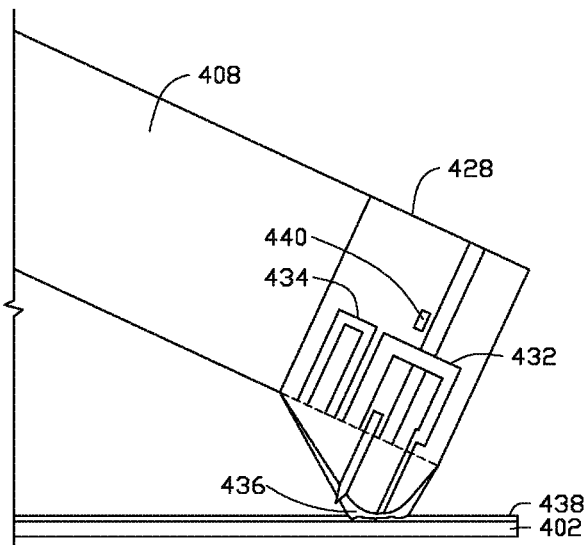
FIG. 4 shows a schematic read/write head when touching down on a disk.

Every intentional or un-intentional contact between the head and the disk creates wear. FIG. 4 shows a schematic read/write head 428 touching down on a disk 402 with overcoat 438. It should be understood that the read/write head 428 and disk 438 may be the same read/write head 128 and disk 438 in FIGS. 1A and 1B. The read/write head 428 may be the read/write head 128 of FIG. 1B. The read/write head 428 includes a read element 432, a write element 434, a TFC element 440, and an overcoat 436. A TFC element 440 thermally actuates the head 428 by creating a protrusion at the MFS, which controls the distance between the elements in the head 428 and the disk 402, or the clearance. A TFC element 440 may be included in a magnetic disk drive as a means of bringing the head 428 closer to the disk 402. The TFC element 440 may be configured from a heating element, and power is applied to cause the protrusion of the head 428 to extend towards the disk 402. The contact between the head 428 and disk 402 causes wear to both.

Figure 5:
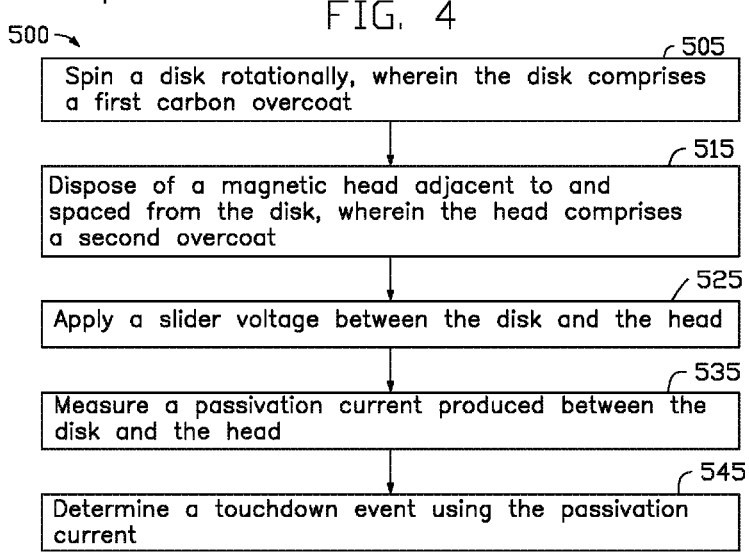
FIG. 5 is a schematic flow chart showing a method of detecting a touchdown event of the read/write head, according to one embodiment.

FIG. 5 shows a method 500 of detecting a contact or touchdown on a disk. The method 500 may be utilized on the head 128 depicted in FIG. 1B. At operation 505, disk 102 is spun rotationally. The disk 102 may be spun by applying a direct current to the drive motor 106 actuating the spindle 104 attached to the disk 102. At operation 515, a magnetic head 128 including overcoat 136 is disposed adjacent to and spaced from the disk 102 including overcoat 138. At operation 525, a slider voltage 142 is applied between the disk 102 and the head 128. In one embodiment, the slider voltage is positive and relates to an oxide formation. In another embodiment, the slider voltage is negative. Applying the slider voltage 142 creates an interfacial current between the overcoat 136 of the read/write head 128 and the overcoat 138 of disk 102. In one embodiment the interfacial current is electrochemical. At operation 535, a passivation current produced between the head 128 and the disk 102 is measured. By monitoring the passivation current for any reductions, a touchdown or contact event may be detected at operation 545.

In order to realize higher magnetic storage densities in hard disk drives, it is necessary to reduce and control the read/write head-to-disk spacing. If the head-to-disk spacing is too small, wear can occur to the overcoat of the head or disc. Thus, it becomes important to monitor and detect degradation in both the overcoat of the head and the overcoat of the disc during operation to be able to make adjustments and preserve the integrity of the hard disk drives. A method for detecting wear on an overcoat involves, applying a slider voltage between the head and the disk while in operation, measuring the interfacial current at a head-disk interface, measuring a change in touchdown power, and determining the electrochemical loss of the overcoat. Additionally, wear can occur if a touchdown event occurs between the head and disk. If a touchdown event occurs, the information being transferred to/from the head and disc may be compromised. Thus, it becomes just as important to be able to detect a touchdown event during operation. A method for detecting such a touchdown event involves applying a slider voltage between a disk and a head while the disk drive is in operation, measuring the passivation current produced between the disk and the head, and determining the spatial location of the touchdown event using the passivation current.

While the foregoing is directed to embodiments of the present disclosure, other and further embodiments of the disclosure may be devised without departing from the basic scope thereof, and the scope thereof is determined by the claims that follow.

What is claimed is:

1. A method of determining carbon overcoat wear on a head, comprising:
spinning a disk, wherein the disk comprises a first overcoat, wherein a magnetic head is disposed adjacent to and spaced from the disk, wherein the head comprises a second overcoat;
applying a slider voltage between the disk and the head;
measuring an interfacial current at a head disk interface;
measuring a change in a touchdown power; and determining an electrochemical loss of the second overcoat.

2. The method of claim 1, further comprising activating a thermally activated desiccator.

3. The method of claim 2, wherein the thermally activated desiccator controls a vapor lubricant.

4. The method of claim 1, wherein the first overcoat comprises carbon.

5. The method of claim 1, wherein the head is a non-heat assisted magnetic recording head.

6. The method of claim 1, wherein the head comprises a thermal fly height control element.

7. The method of claim 1, further comprising applying a direct current to the head.

8. The method of claim 1, wherein the slider voltage is positive.

9. A method of determining carbon overcoat wear on a disk, comprising:
spinning a disk, wherein the disk comprises a first overcoat, wherein a magnetic head is disposed adjacent to and spaced from the disk, wherein the head comprises a second overcoat;
applying a slider voltage between the disk and the head;
measuring an interfacial current at a head disk interface;
measuring a change in a touchdown power; and
determining an electrochemical loss of the first overcoat.

10. The method of claim 9, wherein the slider voltage is negative.

11. The method of claim 9, further comprising adjusting the external environment at the head disk interface.

12. The method of claim 9, further comprising adjusting the humidity at the head disk interface.

13. The method of claim 12, further comprising adjusting the temperature at the head disk interface.

14. The method of claim 12, further comprising reducing or terminating the electrochemical loss of the first overcoat.

15. The method of claim 9, further comprising determining when the interfacial current exceeds a threshold value.

16. The method of claim 9, wherein determining the electrochemical loss of the first overcoat is accomplished in a helium drive.

* * * * *

UNITED STATES PATENT AND TRADEMARK OFFICE
CERTIFICATE OF CORRECTION

| | | |
|---|---|---|
| PATENT NO. | : 9,460,739 B1 | Page 1 of 1 |
| APPLICATION NO. | : 14/954514 | |
| DATED | : October 4, 2016 | |
| INVENTOR(S) | : Bruno Marchon et al. | |

It is certified that error appears in the above-identified patent and that said Letters Patent is hereby corrected as shown below:

On the Title Page

In the Abstract

Column 2, Line 6, please insert --.-- after "spinning"

In the Specification

Column 1, Line 51, please insert --.-- after "spinning"

Column 3, Line 11, please insert --.-- after "spinning"

Signed and Sealed this
Third Day of January, 2017

Michelle K. Lee
*Director of the United States Patent and Trademark Office*